United States Patent
Vyas et al.

(10) Patent No.: US 11,605,096 B2
(45) Date of Patent: Mar. 14, 2023

(54) INITIATING A DEVICE SECURITY SETTING ON DETECTION OF CONDITIONS INDICATING A FRAUDULENT CAPTURE OF A MACHINE-READABLE CODE

(71) Applicant: PAYPAL, INC., San Jose, CA (US)

(72) Inventors: Adhish Nayanendu Vyas, Gilroy, CA (US); Michael Charles Todasco, Santa Clara, CA (US); Michael Jim Tien Chan, Cupertino, CA (US); Jinesh Patel, Zurich (CH)

(73) Assignee: PAYPAL, INC., San Jose, CA (US)

( * ) Notice: Subject to any disclaimer, the term of this patent is extended or adjusted under 35 U.S.C. 154(b) by 104 days.

(21) Appl. No.: 17/092,132

(22) Filed: Nov. 6, 2020

(65) Prior Publication Data

US 2022/0148009 A1    May 12, 2022

(51) Int. Cl.
G06Q 30/00 (2012.01)
G06K 7/14 (2006.01)
G06Q 30/018 (2023.01)

(52) U.S. Cl.
CPC ....... *G06Q 30/0185* (2013.01); *G06K 7/1413* (2013.01)

(58) Field of Classification Search
CPC ... G06Q 30/0185; G06K 7/1413; G06F 19/00
USPC .................. 705/318, 317; 283/72
See application file for complete search history.

(56) References Cited

U.S. PATENT DOCUMENTS

| | | | |
|---|---|---|---|
| 4,321,672 A | 3/1982 | Braun et al. | |
| 8,985,437 B2 | 3/2015 | Burkhart et al. | |
| 9,082,052 B2 | 7/2015 | Rodriguez et al. | |
| 9,170,318 B1* | 10/2015 | Bozarth | H04W 4/026 |
| 10,572,783 B2 | 2/2020 | Studnicka | |
| 2012/0223131 A1* | 9/2012 | Lim | G06Q 30/02 235/375 |
| 2014/0013451 A1 | 1/2014 | Kulka et al. | |
| 2015/0088674 A1 | 3/2015 | Flurscheim et al. | |
| 2015/0178721 A1 | 6/2015 | Pandarajan et al. | |

(Continued)

OTHER PUBLICATIONS

U.S. Appl. No. 15/859,045, filed Jul. 4, 2019, Jamkhedkar et al.

(Continued)

*Primary Examiner* — Edwyn Labaze
(74) *Attorney, Agent, or Firm* — Haynes and Boone, LLP

(57) ABSTRACT

There are provided systems and methods for initiating a device security setting on detection of conditions indicating a fraudulent capture of a machine-readable code. A service provider, such as an electronic transaction processor for digital transactions, may provide in-person or device-to-device data transfers through machine-readable codes, such as to effectuate a payment from one mobile device to another. However, unauthorized devices may be in close enough proximity to also capture the code and impermissibly use the code. Thus, device security settings are used to detect whether fraud may occur in certain settings and implement an operation to hide a valid code. This may include operations to obtain information for the unauthorized device, make the code dynamic, or mask the code in a display. Once a nearby valid scanner is detected, such as through emitted light or sound, the valid code may be displayed.

20 Claims, 7 Drawing Sheets

(56) References Cited

U.S. PATENT DOCUMENTS

| | | | |
|---|---|---|---|
| 2015/0286843 A1* | 10/2015 | Brant | H04L 63/0823 |
| | | | 713/176 |
| 2017/0339140 A1* | 11/2017 | Sudduth | H04L 63/0861 |
| 2018/0234244 A1 | 8/2018 | Starner et al. | |
| 2019/0197377 A1 | 6/2019 | Studnicka | |

OTHER PUBLICATIONS

Furumoto et al.; "Recognition Accuracy Improvement of Obfuscated QR Code by Using Reliability Information and GMD Decoding"; Journal of Information Processing, vol. 26, 350-357 (Apr. 2018).

* cited by examiner

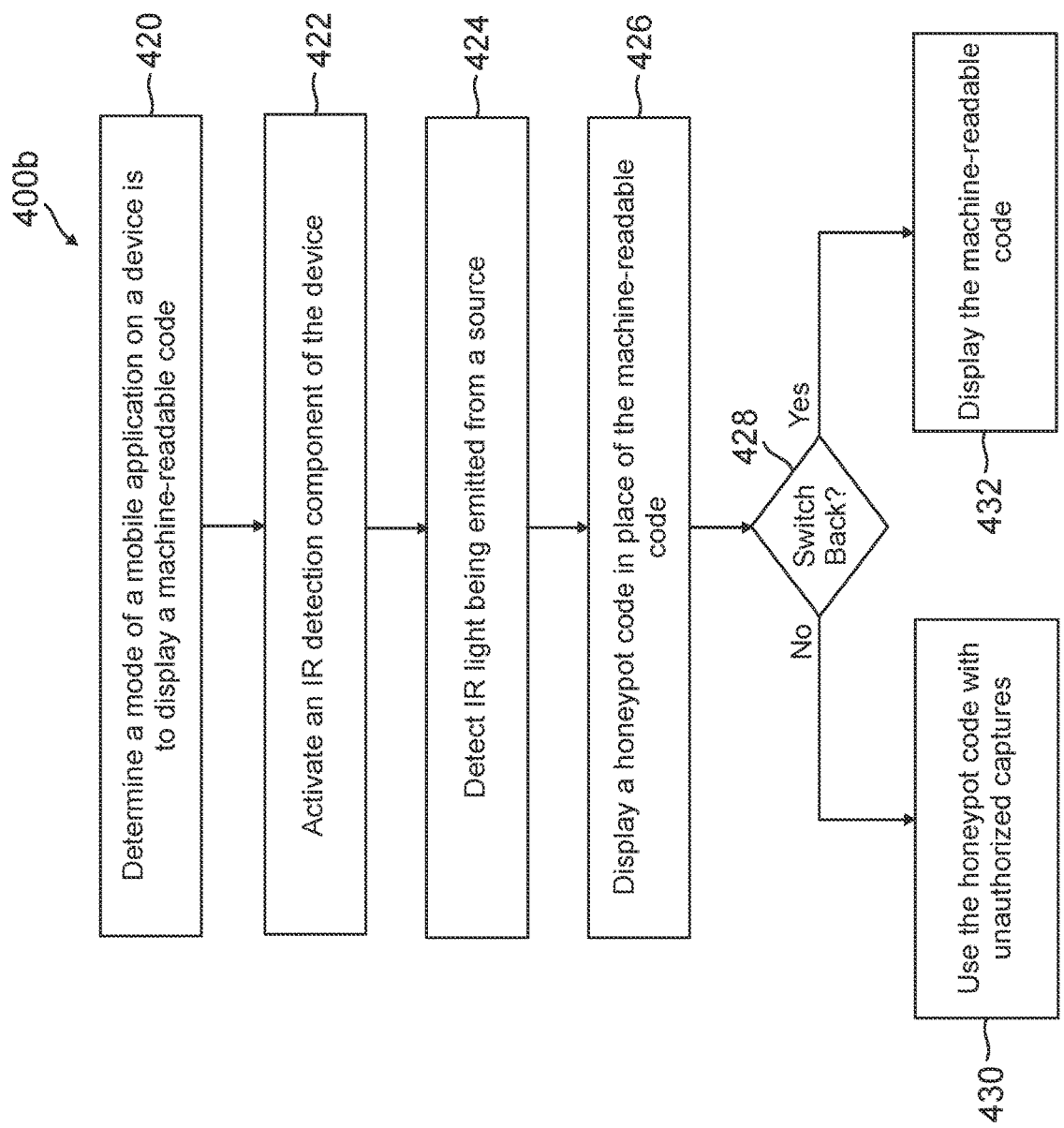

US 11,605,096 B2

INITIATING A DEVICE SECURITY SETTING ON DETECTION OF CONDITIONS INDICATING A FRAUDULENT CAPTURE OF A MACHINE-READABLE CODE

TECHNICAL FIELD

The present application generally relates to digital data security and more particularly to preventing machine-readable codes from being impermissibly captured by unauthorized devices when displayed on computing devices.

BACKGROUND

Online service providers may provide services to different users, such as individual end users, merchants, companies, and other entities. These services may include those associated with machine-readable codes that may be displayed by a computing device, such as a mobile smart phone, and scanned by another computing device. This may allow for conveying information between devices in-person or in local settings. In some cases, the content may be sensitive or private, such as personally identifiable information (PII), funding source information, an account identifier, or a payment identifier. Misappropriation and theft of this data by unauthorized devices may result in fraud, account takeovers, and the like with the service provider. As fraudsters and other malicious users and their devices become more sophisticated, they may attempt to steal this information, such as by capturing an image of a machine-readable code when being displayed by a computing device in this local setting. Thus, service providers require more robust and sophisticated manners of hiding or securing machine-readable codes to prevent capture and reuse by impermissible or unauthorized entities.

BRIEF DESCRIPTION OF THE DRAWINGS

FIG. 4B is a flowchart for displaying a honeypot code in response to detecting a condition in an environment that indicates a potentially unauthorized capture of a machine-readable code, according to an embodiment;

Figure 1:
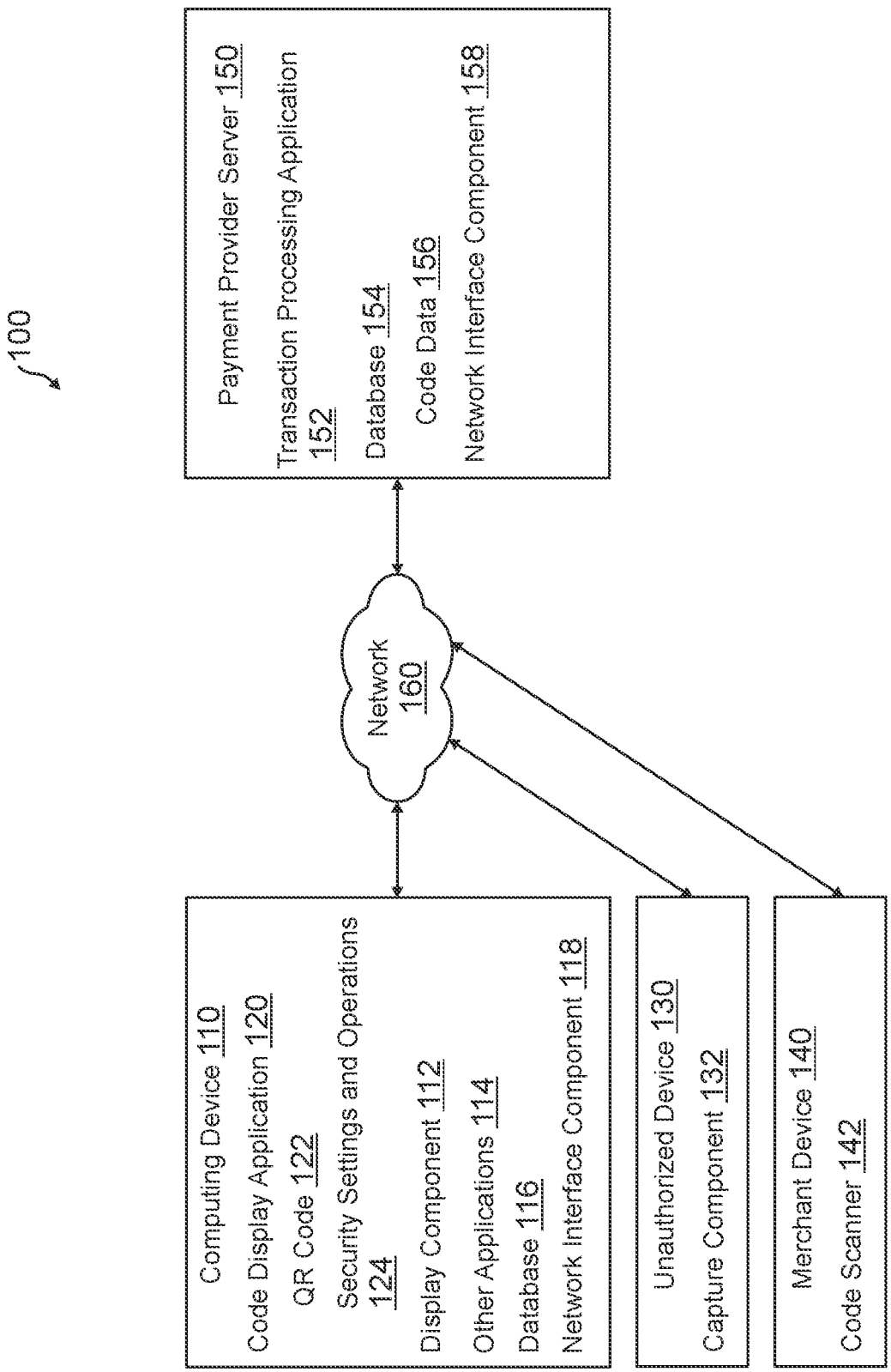
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for initiating a device security setting on detection of conditions indicating a fraudulent capture of a machine-readable code. Systems suitable for practicing methods of the present disclosure are also provided.

Computing devices may be used to display machine-readable codes, where the machine-readable codes include some encoded data. This may be used for multiple functionalities, such as by providing a payment or account data during checkout or otherwise conveying data between two devices using a code scanner. For example, a point-of-sale (POS) device may include a red light, infrared (IR), or other type of scanner that may be capable of capturing barcodes, quick response (QR) codes, and other machine-readable codes that may be displayed on a user interface of a user's computing device. However, when a machine-readable code is output through a display and user interface, nearby devices with scanners, cameras, and other data capture components may also capture the machine-readable code. This may allow the other devices to decode data from the code, which may lead to computing attacks, fraudulent use of the encoded data, and other malicious activities. Where this includes account data, payment information, or the like, the fraudulent party may use the data for fraudulent purposes. Further, if personally identifiable information (PII) or other personal data (including financial data) is encoded to the machine-readable code, this data may also risk misappropriation or theft.

In this regard, a computing device of a user may utilize one or more security procedures to obscure, obfuscate, hide, or otherwise change the machine-readable code if a security risk or threat is detected, including whether a security setting or preference indicates that the machine-readable code should be hidden or changed. This may include detecting a condition for an environment that the computing device is in that indicates a potential threat for an unauthorized scan of the machine-readable code being displayed by the computing device. For example, the computing device may be in a mode or state that indicates that the display of the machine-readable code may be captured by an unauthorized device and the machine-readable code is not currently being displayed to the authorized device for the scan (e.g., a POS device). The computing device may further detect another unauthorized device attempting to capture the code, such as through emitted visible or nonvisible light (e.g., a flash or IR light used by a camera during image capture). The computing device may then implement one or more security operations and/or processes to hide the machine-readable code and/or otherwise make the encoded data secure from capture by the unauthorized device. For example, a honeypot or fake code may be displayed, a constantly morphing code may be used with time stamps, a gamification, task, or movement of the computing device may be used, a visual cryptography animation and key may be used, and the like to prevent the unauthorized scanning or capture of the machine-readable code's data.

For example, a service provider may provide electronic transaction processing to entities through digital accounts, including consumers and merchants that may wish to process transactions and payments. Other service providers may also provide computing services, including email, social networking, microblogging, media sharing, messaging, business and consumer platforms, etc. In order to establish an account, these different users may be required to provide account details, such as a login, password (and/or other authentication credential, such as a biometric fingerprint, retinal scan, etc.), and other account creation details. The account creation details may include identification information to establish the account, such as personal information for a user, business or merchant information for another entity, or other types of identification information including a name, address, and/or other information. The entity may also be required to provide financial or funding source information, including payment card (e.g., credit/debit card) information, bank account information, gift card information, benefits/incentives, and/or financial investments, which may be used to process transactions.

The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and other transaction processing services. These payment services may be provided through machine-readable codes, which may be scanned, captured, and/or exchanged between devices in a transaction, such as a consumer's mobile device and a merchant's POS device and/or scanner. This may include encoded digital wallet information, an account identifier, a code or other data for a payment, and the like. However, malicious users, entities, and/or other computing devices (e.g., computing devices that may include malware, viruses, and the like) may attempt to steal these machine-readable codes by scanning or capturing the codes from a device displaying the code when not authorized to do so, for example, to decode the data and determine sensitive data, such as PII and/or funding source data, which may lead to exploitation and/or unauthorized use by these malicious parties.

In this regard, a user's computing device, such as a mobile smart phone or the like, may first utilize an account with the service provider and a corresponding application (e.g., a dedicated resident application, web browser, or messaging application) to request generation of the machine-readable code having the encoded data. The encoded data may include an account identifier, payment identifier and/or data (e.g., a mechanism to authorize a payment to the receive device), and the like. In various embodiments, when the corresponding transaction or payment using the machine-readable code is below a certain level (e.g., less than $20), a further authentication and/or authorization of the user using the computing device and/or merchant associated with the merchant POS device and/or scanner may not be required. For example, a machine-readable code may be directly linked to an account and thus reusable for multiple payments. In such embodiments, a device and/or fraudulent party that misappropriates the code from the user's computing device may fraudulently use the code for unauthorized transactions. Thus, the computing device may implement one or more security settings, preferences, and/or operations to hide or protect the machine-readable code from misappropriation.

In this regard, the computing device may determine whether the security settings and/or preferences indicate that the machine-readable code should be hidden or protected. These security settings may always hide or protect the codes being misappropriated by other fraudulent or malicious devices. However, in other embodiments, one or more modes of the user's device and/or a condition in an environment of the user's device may be required to be detected in order to secure the machine-readable code within a display and/or user interface of the user's device. For example, an application generating and/or outputting the code may detect a mode of the computing device, such as if the application is in a display mode to display a code to another device or a capture mode to capture another device's displayed code. An orientation, motion, movement, or other positional data may also be detected, such as through an accelerometer or gyroscope, to determine if the computing device is being held by the user (e.g., where the code is not yet to be presented to a code scanner of a POS device), or if the machine-readable code is being presented to a code scanner and therefore is being read by an authorized device.

The application may be configurable to be in multiple modes, such as the display mode to display a machine-readable code, which may be detected when the user moves the computing device in a particular motion or orientation (e.g., outward facing display away from the user to allow another device to image and capture the display of the device). The application may also include a capture or imaging mode to image and capture another device's machine-readable code, such as if a merchant POS device is displaying a code having encoded merchant data and/or identifiers used to process a payment. In such embodiments, the motion and/or movement sensors (e.g., accelerometers, gyroscopes, and the like) on the device may detect such motions and/or orientations. However, further sensors and components may also be used, such as a front or back-facing camera to detect a location of the user of the computing device or other users and/or devices, light emitted by merchant scanners, and the like. A microphone may also be used to detect sounds from merchant scanners, voices and/or instructions from the user or merchant, and other ambient or environmental sounds. This data may be used to configure whether the computing device's application is in a mode to capture or display a machine-readable code.

In further embodiments, the computing device may also detect ambient sounds and/or sounds made by the POS device or code scanner to determine if a condition exists that indicates the machine-readable code should be protected. For example, if nearby users are detected, such as through voices or other sounds in the environment of the user's computing device, the application displaying the code may determine the code should be protected. However, if a sound indicating the device is nearby a POS device or code scanner is detected, the code may be revealed for scanning. Additionally, code scanners may use a particular wavelength of light, while cameras of mobile phones may emit IR light for capture and focus of images or video. Thus, if a sensor or camera of the user's computing device detected the IR light, the application may determine a fraudulent user or entity is attempting to misappropriate the machine-readable code so that the code should be protected from display in the application and/or user interface.

If such a security setting indicates that the machine-readable code should be protected within the application and user interface displaying the code (e.g., based on a mode or condition that is detected), the application may change, adjust, or output a different machine-readable code. This different code may not have any encoded information or may not be functional such that misappropriation of the machine-readable code does not risk fraud or theft of sensitive data. The machine-readable code may also correspond to a "honeypot" code, which may be used to attempt to discover additional information about the party misappropriating the code and/or using the code fraudulently. For example, the machine-readable code may redirect to a webpage or user interface that requests for the party capturing the code to enter additional information or alerts an entity (e.g., the user, merchant, and/or fraudulent party) of the attempted fraudulent use. The honeypot code may also include an operation to share a device, user, or account identifier on the malicious device to be sent to the service provider, merchant, and/or user associated with the device generating the code. Other information may also be used with the honeypot code in order to protect the real usable machine-readable code from being misappropriated, decoded, and/or fraudulently used.

Thereafter, the computing device of the user may further be used to attempt to display the machine-readable code to the authorized code scanner and/or merchant POS device such that the code may be scanned in an authorized manner for use in a process, such as a payment process for a transaction. The computing device may utilize an accelerometer and/or gyroscope to then detect a particular movement, orientation, or motion of the device, such as if the user flips the device to be shown to the code scanner or inverts into a facedown position of the device's display (e.g., to be red by a red-light code scanner at a checkout aisle). These particular motions and/or orientations therefore indicate that the authorized device is scanning the code, and therefore the correct and real machine-readable code should be displayed for scanning. In such embodiments, if a honeypot or other code is being displayed, that code may then be replaced with the genuine code generated in the application through the application's user interface and display component. Further, other data may also be trained on and used to reveal the correct machine-readable code. For example, code scanners may emit a pattern of light when scanning and/or a sound (e.g., a beep to confirm code scanning), which if detected indicates that the user's computing device is likely to be scanned by the authorized device to capture the machine-readable code.

In some embodiments, when displaying the machine-readable code, a constantly or periodically morphing machine-readable code or changeable code, such as a constantly or periodically morphing QR code that changes all or a portion of the displayed code (e.g., lines, dots, or other structures in the two-dimensional (2D) representation of the code) every interval of time or time period. The morphing code may also be associated with timestamps for presentation of each code in the sequence of codes as they are displayed, so that the timestamp and code presented on the user's device may be matched by a backend server or device of the service provider to the code captured by the merchant scanner and/or POS device at a timestamp of capture of the code by the merchant. This allows for the service provider to confirm that the code was presented properly to the merchant POS device and not when another fraudulent entity previously captured the code from the user's computing device and then was later presented to the merchant's scanner and/or POS device. Each frame or code within the morphing code may also have a sequence stamp or identifier so that the sequence and frames of the morphing code may be reconstructed. Thus, if multiple codes are used or required to encode all of the data for the particular transaction, a sequence of codes may be rebuilt by the merchant POS device and/or service provider system. Further, there may be a fault tolerance to display of the morphing code to allow for proper scanning of the morphing code.

In further embodiments, the machine-readable code may also be dynamic and gamified in order to allow for the user to view the machine-readable code and manipulate or change the output and display of the machine-readable code to be the correct output and usable code (e.g., the one generated in the application for the transaction). For example, an initial layout of the machine-readable code (e.g., dots or pixels in a QR code) may be incorrect, unusable, and/or a honeypot code, where the user may receive instructions, hints, or indications that inform the use of inputs to a touch screen or other input device, motions or movements of the computing device, and the like to rearrange the dots, pixels, or other display of the machine-readable code. This allows for the user, over time (e.g., while in a checkout line) to correct the machine-readable code prior to display to the merchant's code scanner and/or POS device. When the code is sufficiently correct, an indication may be provided to the user that the code is now usable. This prevents the machine-readable code from initially being usable and therefore a risk to misappropriation prior to the authorized scan of the machine-readable code by the merchant.

In certain embodiments, the machine-readable code may be associated with a masking key and/or algorithm, where the machine-readable code is not capable of being used (e.g., the encoded data is not recoverable, and/or a honeypot code is used) when the masking key is not used with the code. For example, visual cryptography animation may be used where the code initially may only have a portion of the pixels, dots, or other data so that encoded data is not recoverable, and/or the code is displayed as a honeypot code. A masking key may correspond to another image or key that can be combined with the initial machine-readable code (e.g., the first half or portion of the code), which then provides a correct output of the generated code (e.g., by combining both halves or portions). Thus, the machine-readable code may only be properly scanned when the masking key is combined with the initial code output. The masking key may be stored to the user's device and only combined with the initial code output when requested, or may be stored to a keyfob, RFID or NFC tag, or the like. When stored to another device or component, when that device is brought within proximity to the user's computing device and read, the masking key may be retrieved and used with the initial code output. Thus, other users that capture the initial code output in an unauthorized manner cannot use the initial code output for payments or otherwise misappropriation of data.

In various embodiments, prior to scanning of the machine-readable code, an output device of the user's computing device may be used to emit nonvisible light of a particular wavelength that prevents other device's cameras from properly capturing the machine-readable code. For example, IR light may be used to prevent an autofocus and/or capture component of a mobile device's camera from properly capturing an image. Thus, when the machine-readable code is on a display of the user's mobile device, an output component (e.g., flash component, autofocus component, diode, or the like in the direction of the mobile device's display component) may emit IR light to prevent other devices from capturing the display having the machine-readable code. Further, based on the change to the orientation, movement, or motion of the computing device, the emitted light may then be turned off so that the code scanner of the merchant's POS device may then be used to properly scan the machine-readable code. Further, the user may also request that the emitted light be turned off, such as when the computing device is displayed to the merchant's code scanner.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a computing device 110, an unauthorized device 130, a merchant device 140, and a payment provider server 150 in communication over a network 160. Computing device 110 may be utilized by a user to provide payments, including use of a payment account over network 160, or information to generate machine-readable codes and provide for in-person or local payments or content/data transmission. In this regard, computing device 110 may display a machine-readable code for capture by merchant device 140 to effectuate a payment or otherwise capture data. However, unauthorized device 130 may perform an unauthorized scan of such a code, and attempt to reuse the code in a fraudulent manner. Thus, computing device 110 and/or payment provider server 150 may provide one or more security settings and operations based on modes of computing device 110 and conditions in an environment for computing device 110 to protect the code from an unauthorized scan.

Computing device 110, unauthorized device 130, merchant device 140, and payment provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Computing device 110 may be implemented as a communication device that may utilize appropriate hardware and software configured for wired and/or wireless communication with payment provider server 150. For example, in one embodiment, computing device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. Although only one device is shown, a plurality of devices may function similarly and/or be connected to provide the functionalities described herein.

Computing device 110 of FIG. 1 contains a code display application 120, a display component 112, other applications 114, a database 116, and a network interface component 118. Code display application 120 and other applications 114 may correspond to executable processes, procedures, and/or applications with associated hardware. In other embodiments, computing device 110 may include additional or different modules having specialized hardware and/or software as required.

Code display application 120 may correspond to one or more processes to execute software modules and associated components of computing device 110 to provide features, services, and other operations for a user over network 160, which may include receiving and displaying machine-readable codes from/to local devices for in-person payments, including merchant payments, peer-to-peer payments, and the like. In this regard, code display application 120 may correspond to specialized software utilized by a user of computing device 110 that may be used to access a website or UI that may be used to generate a machine-readable code, such as a QR code, barcode, or the like, using a payment account or other financial instrument with payment provider server 150. In various embodiments, code display application 120 may correspond to a general browser application configured to retrieve, present, and communicate information over the Internet (e.g., utilize resources on the World Wide Web) or a private network. For example, code display application 120 may provide a web browser, which may send and receive information over network 160, including retrieving website information (e.g., a website for payment provider server 150), presenting the website information to the user, and/or communicating information to the website. However, in other embodiments, payment code display application 120 may include a dedicated application of payment provider server 150 or other payment processing entity.

Code display application 120 may be associated with account information, user financial information, and/or transaction histories. In further embodiments, different services may be provided via code display application 120, including other services available through payment provider server 150 that may be utilized in conjunction with code generation and display services for effectuating device-to-device payments and data transfer through machine-readable codes. Thus, code display application 120 may be used to generate and utilize a payment account, for example, through authentication information, personal and financial information stored and used with the account, and the like. The payment account may be used to encode an account or payment identifier to a machine-readable code, which may be used to effectuate the payments or data transfer between devices. This machine-readable code may correspond to a QR code 122 used by code display application 120 for payments. QR code 122 may be generated by code display application 120, such as through an on-device account identifier or digital wallet token, or instead may be requested from payment provider server 150. Once generated, code display application 120 may further protect QR code 122 from discovery and capture by other devices, such as unauthorized device 130 that may attempt to misappropriate QR code 122 and/or the encoded data for fraudulent purposes.

For example, code display application 120 may detect a mode and/or condition that requires protecting QR code from being discoverable and/or captured by unauthorized device 130. The mode may correspond to whether code display application 120 is in a mode to display QR code 122 that has sensitive encoded data, such as a digital wallet token, payment identifier or mechanism, or the like, that may be used to effectuate a payment and susceptible to theft and fraud. Conversely, other modes may not require security and protection of QR code 122, such as where code display application 120 is instead capture an image of another machine-readable code or if QR code 122 being displayed in a display mode does not include sensitive data. Thus, code display application 120 may also be configurable to multiple modes for example, a first mode to display QR code 122 (e.g., a consumer payment mode), a second mode to scan a machine-readable code from merchant device 140 or another device, or other display and capture modes that may be used for different functionalities. The second mode may be used to load data to code display application 120 for processing, such as merchant data or identifiers, other payment account identifiers, and the like.

In some embodiments, code display application 120 may access security settings and operations to determine if conditions exist that require securing of QR code 122 from capture by unauthorized device 130. For example, using one or more sensors of computing device 110, ambient light, nonvisible light, or other emitted light within an environment and/or from unauthorized device 130 may be detected, which may implement a security operation or process to hide, obfuscate, or otherwise may QR code 122 unreadable and/or unusable if captured. Other conditions may also be detected, such as noise, voices, sound levels, and the like, which may indicate an environment is not secure. However, in other embodiments, security operations may always be implemented with display of QR code 122 in order to secure QR code 122 for capture by unauthorized device 130 so that a mode or condition does not need to be detected.

Security settings and operations 124 may be established by a user of computing device 110 and/or payment provider server 150 to secure machine-readable codes. Further, security settings and operations 124 may determine particular operations to protect and secure QR code 122. For example, security settings and operations 124 may dictate whether honeypot QR codes may be displayed in place of QR code 122, which may include fake data or data that may attempt to discover additional information about unauthorized device 130 when captured. Other security operations may include utilising a constantly or periodically morphing code for QR code 122 and/or a dynamic or gamified code that requires a certain sequence of QR codes and/or adjustment of dots, pixels, or the like in QR code 122 prior to proper capture of QR code 122. Additionally, code display application 120 may utilize a visual masking key and algorithm, such as visual cryptography animation, to mask QR code 122 until the masking key is used to reveal the proper display of QR code 122. Security settings and operations 124 may determine the particular operations or data required to be performed or detected, respectively, prior to revealing QR code 122 so that QR code 122 may be properly captured by merchant device 140. This may include training on particular types of code scanners and their emitted visible light, nonvisible light, light patterns, sounds, sound or decibel levels, and/or sound patterns. This allows for identification that display component 122 of computing device 110 is being scanned or captured by merchant device 140 and/or within sufficient proximity to merchant device 140 for scanning. These security operations are discussed herein with respect to FIGS. 2-4 in further detail.

Computing device 110 further includes a display component 112, such as a visual output component that allows for a two-dimensional (2D) or three-dimensional (3D) representation of QR code 122 via code display application 120 to capture by merchant device 140. In this regard, display component 112 may be used with code display application 120 and other application 114 to output data in visual form, and may further provide audio inputs and outputs through a microphone, speaker, headset, or the like. In some embodiments, display component 112 may correspond to a capacitive or resistive touch screen interface, such as one through an LCD or other touch screen of a mobile smart phone. However, other output displays may also be used for display component 122 for computing device 110 in order to cause display of QR code 122 by code display application 120. Further, display component 112 may also include one or more visible or nonvisible light emitters, which may also be used to secure QR code 122. For example, light of a certain wavelength (e.g., IR light) may be emitted of sufficient intensity so as to blind other nearby cameras or otherwise make image capture difficult when using IR sensitive autofocus features.

In various embodiments, computing device 110 also includes other applications 114 as may be desired in particular embodiments to provide features to computing device 110. For example, other applications 114 may include security applications for implementing client-side security features, programmatic client applications for interfacing with appropriate application programming interfaces (APIs) over network 160, or other types of applications. Other applications 114 may also include additional communication applications, such as email, texting, voice, social networking, and IM applications that allow a user to send and receive emails, calls, texts, and other notifications through network 160, which may include interfacing with code display application 120 for generating, receiving, and/or displaying machine-readable codes from one or more sources. Other applications 114 may include device interfaces and other display modules that may receive input and/or output information. For example, other applications 114 may contain software programs, executable by a processor, including a graphical user interface (GUI) configured to provide an interface to the user.

Computing device 110 may further include a database 116 stored on a transitory and/or non-transitory memory of computing device 110, which may store various applications and data and be utilized during execution of various modules of computing device 110. Database 116 may include, for example, identifiers such as operating system registry entries, cookies associated with code display application 120 and/or other applications, identifiers associated with hardware of computing device 110, or other appropriate identifiers, such as identifiers used for payment/user/device authentication or identification, which may be communicated as identifying the user/computing device 110 to payment provider server 150. Thus, database 116 may include account and/or digital wallet identifiers, tokens, or other information that may be used to generating and/or requesting generation of QR code 122 for use with code display application 120. Additionally, received machine-readable codes, such as QR code 122 may be stored to database 116 for further use.

Computing device 110 includes at least one network interface component 118 adapted to communicate with merchant device 140 and/or payment provider server 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency, IR, Bluetooth, and near field communication devices.

Unauthorized device 130 may be implemented as a communication device that may utilize appropriate hardware and software configured for wired and/or wireless communication over network 160, including to capture unauthorized images, videos, or other recordings capturing QR code 122 or another machine-readable code. Unauthorized device may have similar functionality and components as computing device 110 or may be simple code capturing device, such as a code reader. When using unauthorized device 130, the bad actor may utilize a capture component 132 to perform some operation to compromise machine-readable codes displayed by other nearby devices, such as for in-person and/or device-to-device data transfers and payments. For example, capture component 132 may attempt to capture nearby machine-readable codes, such as by imaging those codes or scanning the codes using a scanner or imaging component. In this regard, capture component 132 may correspond to a camera having zoom features, autofocus, and other imaging features and components. In such embodiments, the features and components may emit visible or nonvisible light, as well as audio sounds and the like, which may indicate capture component 132 is in use and attempting to capture images. In further embodiments, capture component 132 may correspond to a code scanner, such as a red-light scanner, IR scanner, or the like.

By capturing nearby machine-readable codes and misappropriating such data, unauthorized device may be used to discover secret or sensitive information, takeover an account, request fraudulent electronic transaction processing, or otherwise perform an illegal, illicit, or fraudulent use of a machine-readable code. This may include reuse of QR code 122 for further transaction processing, which requires computing device 110 to secure and protect QR code 122 from capture and reuse. In one embodiment, unauthorized device 130 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. Although only one device is shown, a plurality of devices may function similarly and attempt to capture machine-readable codes displayed by computing device 110 and/or other computing devices.

Merchant device 140 may provide sales, checkout, and payment processes for a transaction to purchase one or more items for sale from a user, such as a merchant or seller corresponding to merchant device 140. In this regard, merchant device 140 may correspond to a POS device that provides a convenient interface to permit a merchant to enter, view, and/or edit items and/or services for purchase by the user associated with computing device 110. For example, merchant device 140 may be implemented as an application having a user interface enabling the merchant to enter item information and request payment for a transaction on checkout/payment of one or more items/services. Thus, the merchant may initiate a transaction using merchant device 140 by providing one or more items to purchase in a transaction with the merchant associated with merchant device 140, which may be entered to a transaction. Once a payment amount is determined for a transaction for items to be purchased by the second user, merchant device 140 may request payment from the user for transaction processing. Payment may be provided through a machine-readable code displayed by computing device 110, which may have encoded data to facilitate a payment.

Thus, merchant device 142 may further include a code scanner 142, which may correspond to a visual scanner used to scan machine-readable codes to receive a capture of the code and/or determine the encoded data. In this regard, code scanner 142 may correspond to a red-light scanner, IR scanner, camera, of other visual capture device, including ones that may capture single images or frames as well as videos having multiple frames. During capture, code scanner 142 may capture an image or video of and/or encoded data in a machine-readable code, as well as timestamp of capture and other encoded data including sequence data for dynamic or constantly morphing machine-readable codes. Code scanner 142 may also emit visible or nonvisible light or radiation of a particular wavelength (e.g., color, IR, ultraviolet), for a certain time or intensity, and/or in a certain pattern, as well as certain sounds, sound or decibel levels, and/or sound patterns, which may be used to specifically identify merchant device 140 and/or code scanner 142. Thus, computing device 110 and/or payment provider server 150 may train on types of code scanner 142 and their corresponding emitted light and/or sound to determine whether computing device 110 is in proximity to code scanner 142 and QR code 122 is trusted to be properly revealed and/or displayed for authorized scanning by code scanner 142.

Once QR code 122 and/or other machine-readable codes are scanner, payment provider server 150 may be used for payment processing. For example, payment provider server 150 may process the transaction with the provided machine-readable code using an account of a user associated with computing device 110. Merchant device 140 may then receive the results of the transaction processing, and complete the transaction with the respective user, for example, by providing the user the items for the transaction or declining the transaction where the user is not authenticated or the transaction is not authorized (e.g., insufficient funds, rejection of the transaction based on risk analysis by service provider server 150, use of a fraudulent code). A transaction history may then be generated by merchant device 140.

Payment provider server 150 may be maintained, for example, by an online service provider, which may provide operations for electronic transaction processing, including use of machine-readable codes for data transfers, for example, to effectuate a payment between devices in a local setting. In this regard, payment provider server 150 includes one or more processing applications which may be configured to interact with computing device 110 to provide a digital account for electronic transaction processing and use that digital account for the electronic transaction processing through machine-readable codes. In one example, payment provider server 150 may be provided by PAYPAL®, Inc. of San Jose, Calif., USA. However, in other embodiments, payment provider server 150 may be maintained by or include another type of service provider that provides services for device-to-device data transfers (e.g., in-person payments between devices through scanning of machine-readable codes).

Payment provider server 150 of FIG. 1 includes a transaction processing application 152, a database 154, and a network interface component 158. Transaction processing application 152 may correspond to executable processes, procedures, and/or applications with associated hardware. In other embodiments, payment provider server 150 may include additional or different modules having specialized hardware and/or software as required.

Transaction processing application 152 may correspond to one or more processes to execute modules and associated specialized hardware of payment provider server 150 to perform a service to end users of payment provider server 150, such as sending and receiving electronic payments and performing electronic transaction processing using computing device 110. In this regard, transaction processing application 152 may correspond to specialized hardware and/or software used by a user associated with computing device 110 to perform one or more electronic transaction processing services. Transaction processing application 152 may be used by a user to establish a payment account and/or digital wallet, which may be used to generate and provide user data for the user, as well as send and/or receive payments with other devices and accounts (e.g., merchant device 140). In various embodiments, financial information may be stored to the account, such as account/card numbers and information. A digital token for the account/wallet may be used to send and process payments, for example, through an interface provided by payment provider server 150.

Thus, the financial information may also be used to establish a payment account and provide payments through the payment account. The payment account may be accessed and/or used through a browser application and/or dedicated payment application. Further, the account may be used for generation and use of machine-readable codes that may be used to effectuate a payment to another device when the codes are read. In some embodiments, transaction processing application 152 may generate the machine-readable codes for users and devices, such as by generating QR code 122 for computing device 110 using code data 156 stored by database 154. However, in other embodiments, code data 156 may be provided to and/or stored locally by computing device 110 where computing device 110 may utilize code data 156 to generate QR code 122 or another machine-readable code. In such embodiments, when QR code 122 or another machine-readable code associated with code data 156 is received, transaction processing application 152 may process the received code, for example, using a payment account or financial instrument associated with code data 156. Other machine-readable codes may also be generated that do not include sensitive data or payment data, such as one identifying an account or user so that a payment may be effectuated to that user when scanned. Thus, in some embodiments, computing device 110 may not require securing and protecting the machine-readable code from unauthorized capture or scanning.

Additionally, payment provider server 150 includes database 154. Database 154 may store various identifiers associated with computing device 110. Database 154 may also store account data, including payment instruments and authentication credentials, as well as transaction processing histories and data for processed transactions. Database 154 may store financial information or other data generated and stored by other applications 154. Database 154 may also include PII and/or other sensitive or private data. The financial information, account data, payment data, and/or other sensitive data may be encoded to one or more machine-readable codes, such as QR code 122 used with computing device 110. In this regard, database 154 may include code data 156, which may be used in processing QR code 122 or other machine-readable codes, such as by transaction processing application 152 to process a payment between computing device 110 and merchant device 140.

In various embodiments, payment provider server 150 includes at least one network interface component 158 adapted to communicate computing device 110, unauthorized device 130, and/or merchant device 150 over network 160. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency (RF), and infrared (IR) communication devices. Note that while the descriptions herein focus on payment transactions and use of payment provider server 150, any type of data transfer between devices using machine-readable codes may be suitable. For example, the machine-readable code may be used for access or entry, such as for travel, an event, or a facility. Such data can also be compromised. As such, servers other than ones associated with a payment provider may be used.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
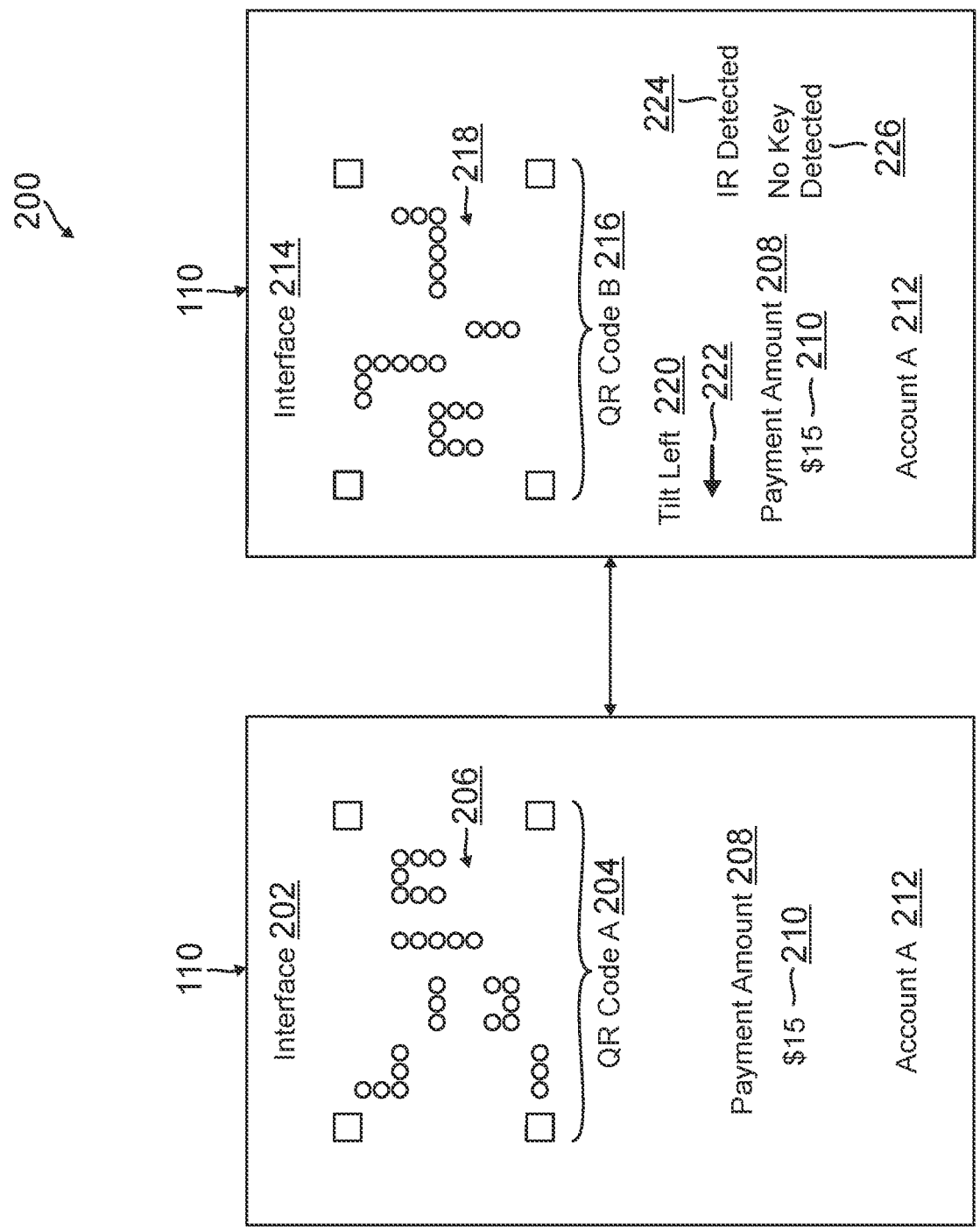
FIG. 2 is an exemplary block diagram of a security setting initiated on an interface of a computing device when displaying a machine-readable code, according to an embodiment.

FIG. 2 is an exemplary block diagram 200 of a security setting initiated on an interface of a computing device when displaying a machine-readable code, according to an embodiment. Diagram 200 of FIG. 2 includes computing device 110 displaying two different interfaces, such as those that may be output by code display application 120 when displaying a machine-readable code, as discussed in reference to system 100 of FIG. 1. In this regard, the interfaces in diagram 200 may be used to obfuscate, hide, remove, obscure, change, or otherwise make a valid machine-readable code invalid or unusable for payment processing.

For example, initially a user of computing device 110 may view an interface 202 where the user has requested generation of a machine-readable code in the form of a QR code A 204 to provide a payment to another device, such as a merchant POS device and scanner or another mobile computing device of a second user. QR code A 204 may include a QR code layout A 206, which corresponds to the arrangements of boxes, dots, pixels (of various sizes), or other pattern of black, white, or other colored patterns that may be used to encode data. In diagram 200, QR code A 204 may include payment data encoded to QR code layout A 206. This may include an account identifier, payment identifier, or the like that allows for another device to scan the QR code and process a payment to the account of the other device. For example, a payment amount 208 is shown entered by the user for a value 210 of $15. Payment of value 210 may be performed using account A 212, such as stored value to the account or a financial instrument (e.g., payment card, bank account, or the like) that may be used to pay or transfer value to another user or merchant.

However, in certain environments and/or times, a user and/or payment provider service may wish to prevent QR code A 204 from being properly displayed so as to avoid being captured by unauthorized devices that may improperly utilize QR code A 204. This may be based on a particular mode causing display of QR code A 204 (e.g., in a display mode to cause a merchant POS device to scan the code that has sensitive or payment data). Required security of QR code A 204 may also occur based on ambient or detected conditions (e.g., when detecting IR from a potential device camera) and/or based on an amount or functionality of QR code A 204 (e.g., if further authentication is not required for use or reuse of QR code A 204, where the value of QR code A 204 is high, etc.). In such events, interface 202 may transition to interface 214 or interface 214 may instead be initially displayed by computing device 110. For example, an IR alert 224 indicates that local IR light has been detected, which may indicate attempts at unauthorized capture of interfaces 202/214.

In interface 214, QR code B 216 replaces QR code A 204 for display to prevent unauthorized capture of QR code A 204 and misappropriation of such data. In QR code B 216, a QR code layout B 218 is instead shown that may obfuscate, hide, remove, obscure, change, or invalid data in order to prevent unauthorized capture of QR code A 204 and abuse of data encoded to QR code layout A 206. In this regard, QR code B 216 may correspond to a honeypot QR code, where QR code layout B 218 includes data encoded to be invalid and/or to cause an unauthorized device to provide a payment provider service (e.g., payment provider server 150 in system 100) with additional information that allows for further identification of the unauthorized device and/or user. For example, QR code layout B 218 may include encoded data and/or operations to request a login or other identifier/credential from the unauthorized device capturing QR code B 216.

In further embodiments, QR code layout B 218 may be constantly or periodically morphing so that QR code B 216 is a sequence of QR codes and images, each which may be associated with a numbering or identifier in the sequence and/or time stamp that allows for correlation of the displayed QR code in the morphing QR code on computing device 110 with the corresponding captured QR code by a merchant POS device's scanner. QR code layout B 218 may also correspond to a dynamic or gamified QR code layout, where proper display for QR code A 204 (e.g., from QR code layout B 218 of QR code B 216) requires actions, inputs, movements, or the like from the user of computing device 110. A tilt instruction 220 may be displayed with a visual cue 222 that may indicate the actions the user is required to take in order to convert QR code B 216 to usable QR code A 204. Interface 214 therefore displays data that may be conveyed to a user when a machine-readable code (e.g., QR code A 204) is secured and protected in interface 214 (e.g., QR code A 204 is obfuscated), however, it is understood more, less, or different data may also be presented to the user. In some embodiments, QR code A 204 may be first displayed in interface 202 and converted to QR code B 216 in interface 214. However, in other embodiments, QR code A 204 may be immediately hidden from display in interface 202, and thus, interface 214 is displayed first.

Further, when QR code A 204 should be properly displayed, such as if a mode or condition exists that indicates interface 202 may be properly scanned by an authorized device (e.g., a scanned of a merchant POS device), client device may display interface 202 for authorize code scanning. In this regard, tilt instruction 220 and/or visual cue 222 may be used with the honeypot QR code corresponding to QR code B 216 and/or the dynamic or gamified QR code corresponding to QR code B 216 in order to cause a display of QR code A 204. However, in other embodiments, different data may be detected to cause display of QR code A 204 from QR code B 216, such as light and light patterns and/or sound or sound patterns emitted from a known or trusted scanner, scanner type, or scanner mechanism, which indicates computing device 110 is within a certain proximity to an authorized scanner. Further, a keyfob device, RFID/NFC chip, and/or on-device masking key may be used with masked data in QR code layout B 218 to properly render QR code layout A 206. If no key is detected or user, as displayed with a key alert 226, QR code layout B 218 may be partially or entirely masked (e.g., using visual cryptography animation or the like). However, by placing a corresponding key device or using an on-device key, QR code layout B 218 may be converted to QR code layout A 206 for proper rendering and display to a scanning device.

Figure 3:
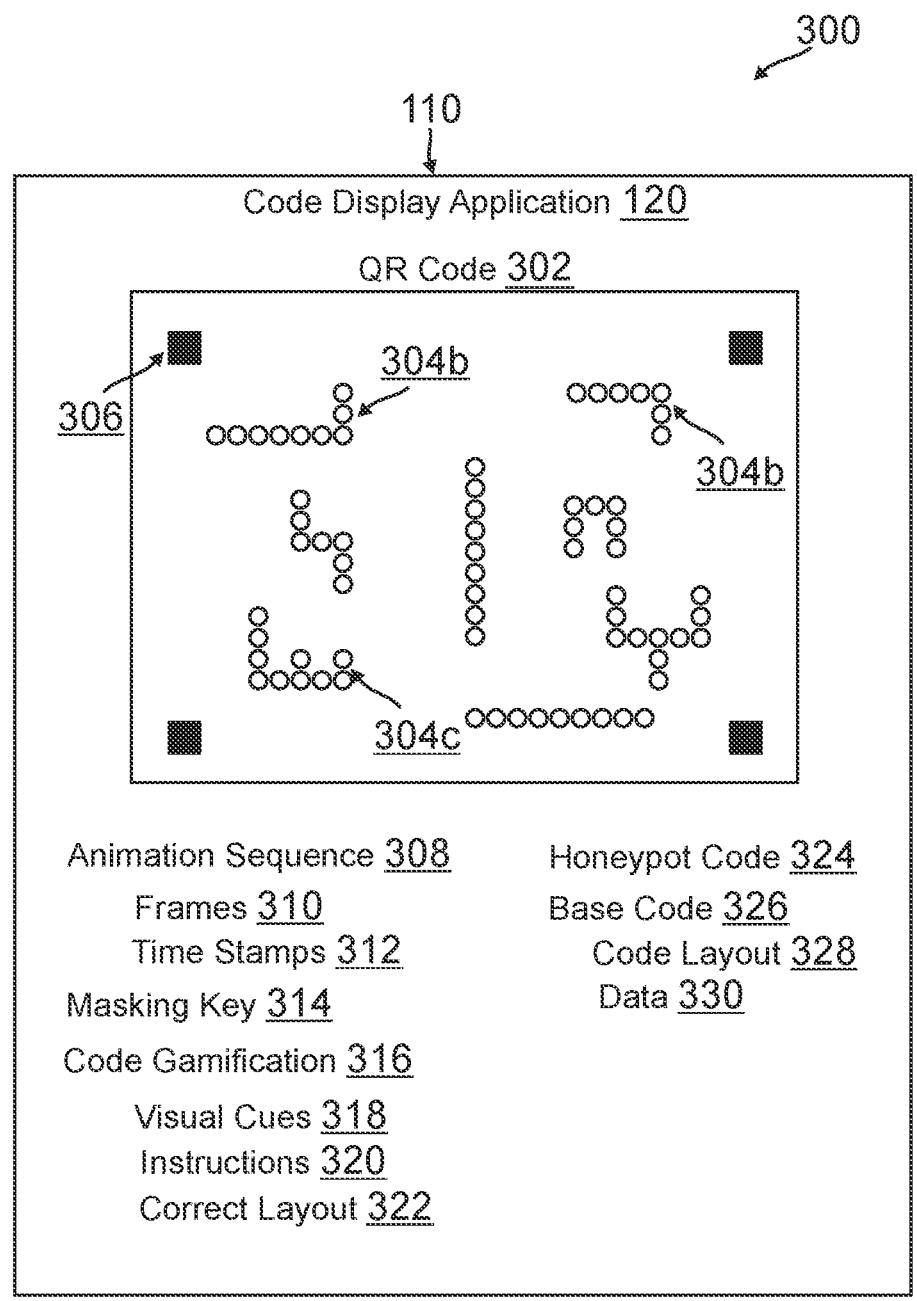
FIG. 3 is an exemplary environment where a computing device may display a machine-readable code based on security settings, according to an embodiment.

FIG. 3 is an exemplary environment 300 where a computing device may display a machine-readable code based on security settings, according to an embodiment. Environment 300 includes client device 110 and code display application 120, as discussed in reference to system 100 of FIG. 1. As such, environment 300 displays security settings and operations that may be used with a QR code 302 to secure QR code 302 from unauthorized capture by one or more nearby or local devices, such as for fraudulent use and/or data misappropriation.

In this regard, QR code 302 is shown with encoded data, including data and error corrections keys 304$a$-$c$, however, other portions of QR code 302 may also have encoded data, error correction mechanisms, and the like. For example, QR code 302 further includes at least one positioning marker 306 and may further include other dots, squares, boxes, or patterns as needed or desired for a QR code (e.g., positioning and/or alignment markers, version information, timing patterns, format information, etc.). When performing one or more security operations available to code display application 120 in environment 300 based on security settings and preference, this encoded data may be adjusted, obfuscated, or otherwise changed in order to secure QR code 302 from improper or unauthorized capture by malicious devices. However, in other embodiments, code display application 120 may instead use an entirely different QR code to replace QR code 302, such as a pre-stored honeypot QR code.

In this regard, an animation sequence 308 may be used to present a sequence of QR codes and/or a constantly or periodically morphing QR code, which may include one or more frames to display QR code 302 or other data (e.g., data that may be used to reconstruct QR code 302 or multiple frames of a morphing QR code). For example, frames 310 may be used with timestamps 312 (as well as any sequencing information) to display QR codes having portions of data similar to QR code 302 that may be used to reconstruct QR code 302. In further embodiments, where multiple frame the same, similar, or different to QR code 302 are captured having different timestamps, timestamps 312 may be compared to determine whether a timestamp of display of one of frames 310 matches or is within a degree of error to a timestamp of capture of that frame from frames 310. Further, where multiple of frames 310 have been captured at different ones of timestamps 312, the length of capture may indicate whether the code scanner is to be trusted and timestamps 312 match frames 310, such as where a prolonged capture of computing device 110 occurs by a trusted device.

In further embodiments, a masking key 314 may be used with an animation process and/or masking technique or algorithm to split or mask QR code 302, which requires masking key 314 to properly display QR code 302. Masking key 314 may be locally stored and used when an unmasking operation is requested to reveal QR code 302, or may be stored to another device, such as a keyfob, RFID/NFC chip, or the like. Masking key 314 may therefore correspond to operations to obfuscate QR code 302 in a display, rendering QR code 302 unreadable. This may include using a cryptographic process with a shared key or key pair to mask QR code 302 from capture unless combined or decrypted using masking key 314. One such process may include use of visual cryptographic animation where QR code 302 may be split into two or more portions of unreadable coded data, which requires layering or combination with the other layers to properly view QR code 302. For example, some or all of error corrections keys 304a-c may be removed or hidden, and are only revealed or added back when masking key 314 is used.

In further embodiments, a code gamification 316 may correspond to one or more security operations to gamify or make dynamic QR code 302, for example, by allowing for manipulations to error corrections keys 304a-c and portions of those keys (e.g., the dots shown in environment 300). For example, positioning of patterns in error corrections keys 304a-c may be changed so that QR code 302 is no longer readable and/or include the sensitive encoded data. This may generate a different layout of QR code 302 as error corrections keys 304a-c are modified. Visual cues 318 and/or instruction 320 may then be presented through an interface of code display application 120 in order to obtain correct layout 322 of error corrections keys 304a-c within QR code 302. For example, visual cues 318 may include indications of motion of computing device 110 to cause movements of dots or patterns in error corrections keys 304a-c, as well as colors, signals, signs, or the like to move or manipulate error corrections keys 304a-c into correct layout 322. Similarly, instructions 320 may provide visual, audio, or audiovisual instructions to the user to move error corrections keys 304a-c into correct layout 322.

Additionally, a honeypot code 324 may be used in some embodiments to attempt to capture additional information from the unauthorized device that attempts to capture QR code 302. Honeypot code 324 may directly hide QR code 302 or may provide additional functionalities to attempt to have the unauthorized device provide additional information that allows for discovery of the fraudulent device or user. Honeypot code 324 may be directly displayed by code display application 120 when performing security of QR code 302. However, honeypot code 324 may also be used with one or more of the above processes, such as to be displayed during animation sequence 308 and/or code gamification 316 to capture any unauthorized scans or otherwise prevent capture of QR code 302 by unauthorized devices.

Further, code display application 120 may revert back to QR code 302 having the correct encoded data when a valid or authorized scan of QR code 302 is detected or indicated by a user or nearby code scanner. Thus, code display application 120 includes base code 326 to retain the layout of error corrections keys 304a-c for QR code 302. This may correspond to a code layout 328 and data 330 encoded into QR code 302. Base code 326 may be used when a valid scan or capture of an interface and/or display of computing device 110 is detected, for example, by reverting back to QR code 302 for a proper reading and effectuation of a payment.

Figure 4A:
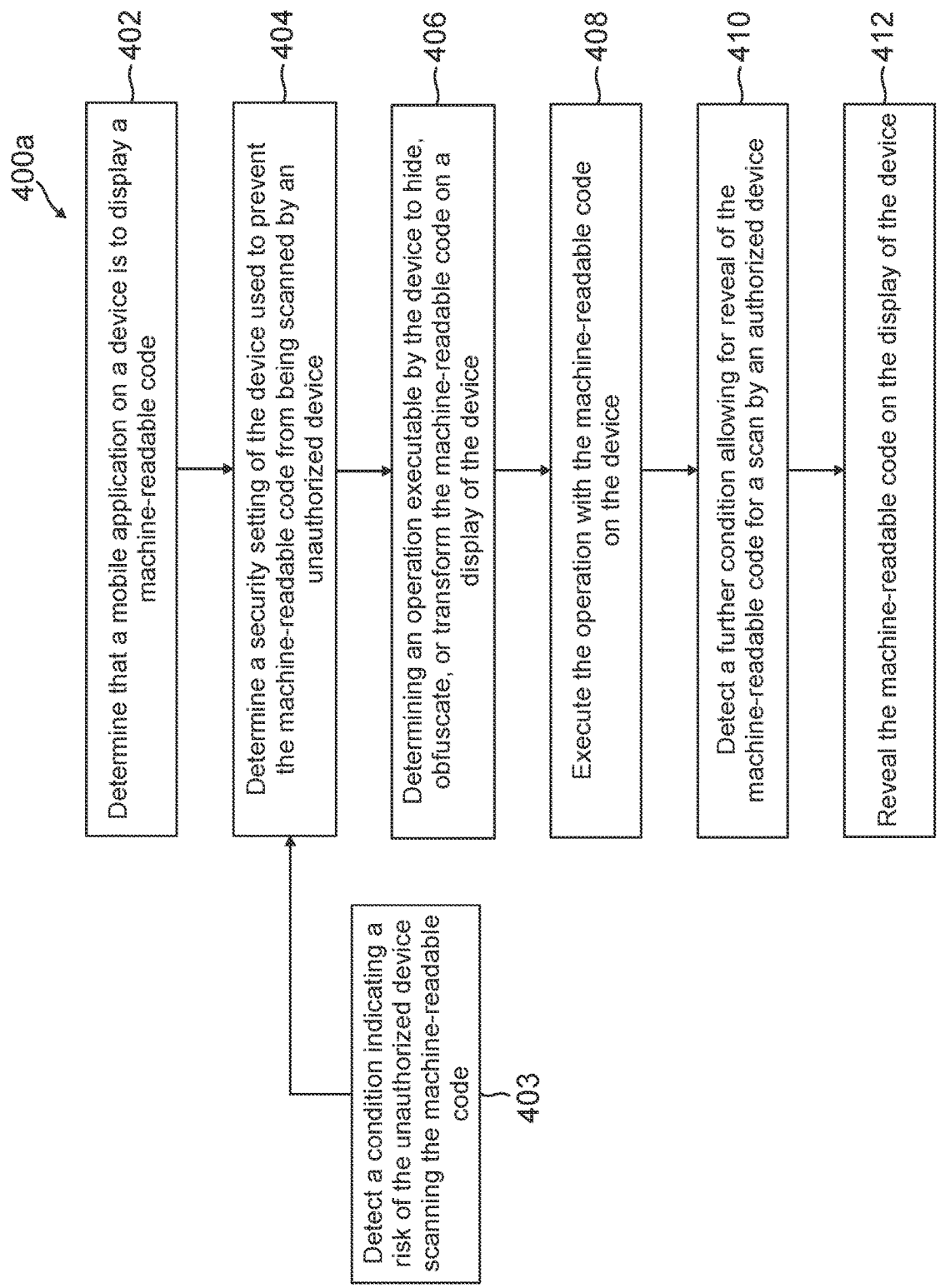
FIG. 4A is a flowchart for initiating a device security setting on detection of conditions indicating a fraudulent capture of a machine-readable code, according to an embodiment.

FIG. 4a is a flowchart 400a for initiating a device security setting on detection of conditions indicating a fraudulent capture of a machine-readable code, according to an embodiment. Note that one or more steps, processes, and methods described herein of flowchart 400a may be omitted, performed in a different sequence, or combined as desired or appropriate.

At step 402 of flowchart 400a, it is determined that a mobile application on a device is to display a machine-readable code. For example, the mobile application may request a QR code (or other machine-readable code) generation and/or display from stored data and/or an online payment provider service. The code may include encoded data that may be used to effectuate a payment when scanned by another device, such as an account or payment identifier associated with an available balance or financial instrument. Thereafter, at step 404, a security setting of the device used to prevent the machine-readable code from being scanned by an unauthorized device is determined. This security setting may indicate the requirements for hiding or masking a machine-readable code, such as the required modes or conditions where the machine-readable code is required to be secured. For example, an on-device or application mode, such as a code display mode for a payment code (e.g., having sensitive encoded data) may be in use, which indicates the machine-readable code should be secured.

In some embodiments, a condition may be detected indicating a risk of the unauthorized device scanning the machine-readable code, at step 403. For example, emitted light or sound during a camera operation of the unauthorized device may be detected by an optical sensor of the device having the machine-readable code. In other embodiments, nearby voices or sound may indicate crowded or untrusted environments. Further, if the device is being held in an orientation (e.g., the display screen outward away from the user) and/or not being used with a POS device scanner (e.g., being laid face down on a scanner), the device with the machine-readable code may determine that code is potentially at risk of misappropriation. In further embodiments, risk may be indicated based on a location of the device, such as in highly congested areas, such as at a concert or sporting event, or areas that have historically been known to have fraudulent activities associated with the area.

Further, the security setting or preferences may also be associated with operations to secure the machine-readable code. At step 406, an operation executable by the device to hide, obfuscate, or transform the machine-readable code on a display of the device is determined. As discussed herein, those operations may include using a honeypot or fake machine-readable code including those that attempt to catch or reveal the bad actor and/or fraudulent device. However, operations associated with constantly morphing or sequences of machine-readable codes, dynamic and/or gamified machine-readable codes, and/or masking or visual cryptographic animation may also be used. Additionally, on device components may assist with operations to hide or obfuscate displays and machine-readable codes. For example, emitted IR or other radiation by the device having the code may be used to make nearby capture of the device's display difficult.

Thereafter, at step 408, the operation is executed with the machine-readable code on the device, for example, to hide, obfuscate, or transform the machine-readable code so it may not be captured by another nearby device. In this regard, the machine-readable code may be hidden until the user performs one or more operations and/or a valid scan or attempt of a scan of the machine-readable code is detected. Thereafter, at step 410, a further condition allowing for reveal of the machine-readable code for a scan by an authorized device is detected. This may occur when the user views an interface having the machine-readable code and performs some operation to reveal to code, such as finishing altering the code into a valid form during a game or dynamic display. The user may also use a masking key to reveal the machine-readable code. However, in other embodiments, a valid scanner may be detected nearby, such as through a particular light source and/or pattern or having particular sounds and/or sound patterns. These valid scanners may be analyzed for validity and a particular light and/or sound/decibel level may be required to determine the valid code scanner is in close enough proximity. Thereafter, the machine-readable code is revealed on the display of the device, at step 412. This may the allow for the authorized scanning and capture of the machine-readable code, such as by a merchant POS device and scanner.

FIG. 4B is a flowchart 400b for displaying a honeypot code in response to detecting a condition in an environment that indicates a potentially unauthorized capture of a machine-readable code, according to an embodiment. Note that one or more steps, processes, and methods described herein of flowchart 400b may be omitted, performed in a different sequence, or combined as desired or appropriate.

At step 420 of flowchart 400b, a mode of a mobile application on a device that is to display a machine-readable code is determined (the mode may be determined, as stated above, based on orientation, motion, movement, or other positional data detected by an accelerometer or a gyroscope). The mode may correspond to a display and/or payment mode, where a machine-readable code has potentially sensitive data (e.g., PII, account/payment data or identifiers, and the like) encoded, such as a QR code. The mode may therefore correspond to a mode of an on-device application, such as a mobile application of a mobile device, where the application is displaying a machine-readable code to effectuate a data transfer to another device via a camera capture or code scanner. In response to this mode, an IR detection component of the device is activated, at step 422. The IR detection component may correspond to a camera, sensor, or the like that is capable of detecting light within the IR spectrum, such as IR light that may be emitted by an unauthorized device when performing autofocus features or the like of a camera. For example, mobile devices may utilize IR light during autofocus or other camera features, which may indicate the camera is attempting to capture an image or video. Thus, an unauthorized device that is pointed at or attempting to capture an image of a display of the device having the machine-readable code may be detected through IR light emissions.

At step 424, IR light being emitted from a source is detected. The IR light may come from multiple sources but may also indicate a particular camera and/or unauthorized device attempting to capture a display of the machine-readable code on the device. In order to secure the machine-readable code in the event that the unauthorized device is attempting to capture the code being displayed via a display component, at step 426, a honeypot code is displayed in place of the machine-readable code (i.e., the machine-readable code/QR code is switched out for a honeypot code/QR code). The honeypot code may correspond to a machine-readable code that is invalid or does not contain sensitive data, such as one that is not reusable if the unauthorized device captures the honeypot code and attempts to reuse the honeypot code or decode the honeypot code.

In further embodiments, the honeypot code may also include data and/or a process to determine further information about the fraudulent device and/or user. For example, the honeypot code may include a process, which, when decoded, attempts to obtain information from the device performing the decoding (e.g., the unauthorized device) or request the unauthorized user to enter identifying information. Therefore, upon capture by a fraudster device, the honeypot code may cause a process to be executed on the fraudster device that captures certain user or device data. Once the honeypot code is utilized and transmitted to a payment service provider (the user or device data may be transmitted along with the honeypot code or embedded within the honeypot code), the payment service provider may utilize the captured user or device data to identify the fraudster or fraudster device. In some embodiments, the honeypot code may also include encoded data that alerts another device (e.g., a merchant POS device scanning the code) of the unauthorized nature of the honeypot code so that the corresponding merchant and/or payment provider service may identify the unauthorized user. Other codes aside from a honeypot code may also be displayed, such as a gamified or dynamic code, a masked code requiring a masking key, or the like.

At step 428, a decision is made of whether to switch back to the original machine-readable code, for example, in order to display that code to an authorized device for scanning (e.g., to effectuate a payment to a merchant POS device). The decision may be based on detection of a motion, movement, or orientation of the device, such as when the device is placed face-down on a merchant code scanner. Other activities may also cause the decision to switch back to the valid machine-readable code, such as by providing a masking key stored on-device or from another device (e.g., keyfob, RFID/NFC chip device, or the like that is in proximity to the device having the machine-readable code), and the like. Furthermore, the device may determine, based on communicating with the IR detection component that no IR light has been detected, and therefore, the device may safely proceed with displaying the machine-readable code for use. Nearby environmental data may also be detected, such as light and/or sounds emitted by a known or valid code scanner. If these conditions are not detected, at step 430, the honeypot code is used with unauthorized captures. Thus, the honeypot code may continue to be displayed by the device. However, if the conditions are met, at step 432, the machine-readable code is displayed. This allows for scanning of the machine-readable code, after which, the machine-readable code may be removed from display and/or further hidden to prevent additional captures.

Figure 4C:
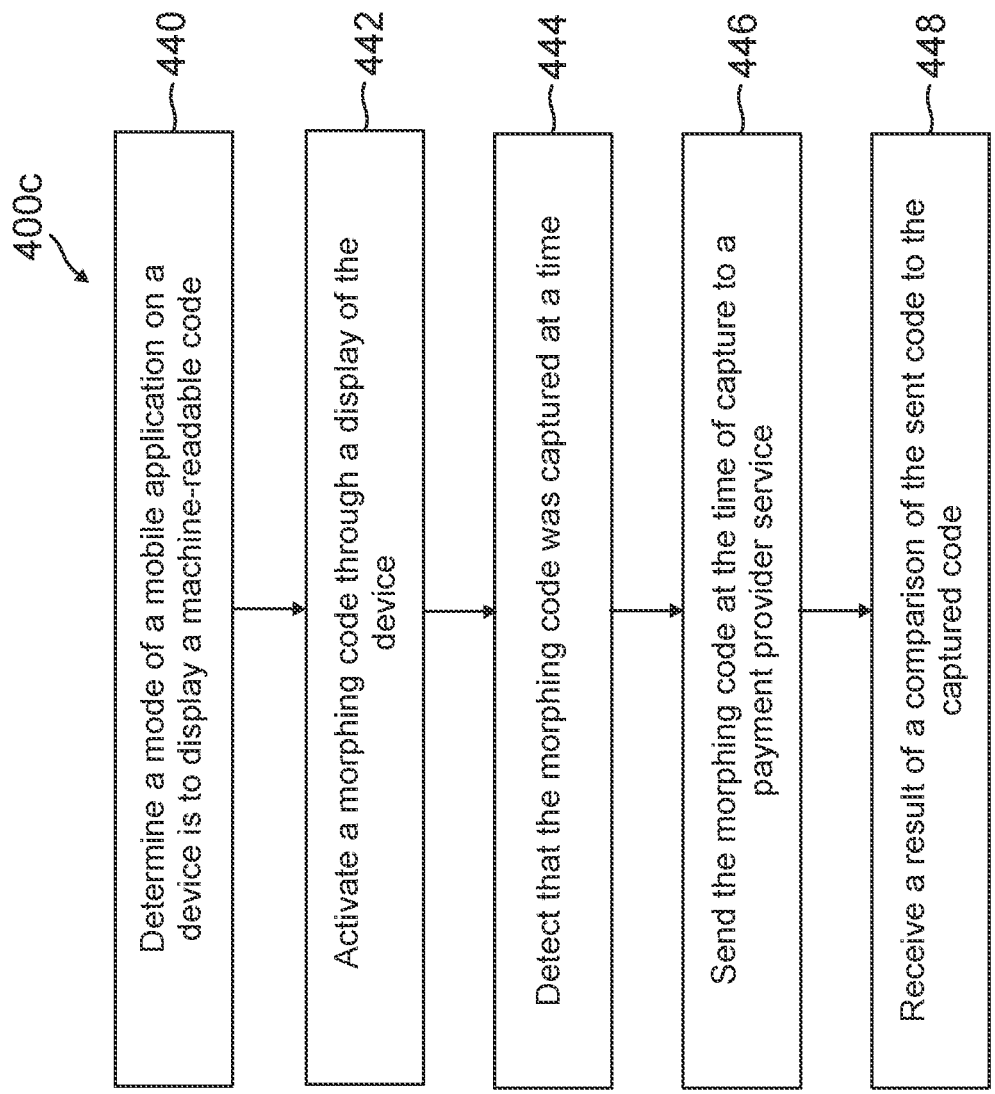
FIG. 4C is a flowchart for displaying a morphing code used to secure a machine-readable code during display on a computing device, according to an embodiment.

FIG. 4C is a flowchart 400c for displaying a morphing code used to secure a machine-readable code during display on a computing device, according to an embodiment. Note that one or more steps, processes, and methods described herein of flowchart 400c may be omitted, performed in a different sequence, or combined as desired or appropriate.

At step 440 of flowchart 400c, a mode of a mobile application on a device that is to display a machine-readable code is determined (the mode may be determined, as stated above, based on orientation, motion, movement, or other positional data detected by an accelerometer or a gyroscope). Similar to step 420 of flowchart 400b, this may correspond to a display or payment mode associated with displaying a machine-readable code having sensitive encoded data. At step 442, a morphing code is activated through a display of the device. The morphing code may correspond to a machine-readable code that alternates through many different codes, for example, in a sequence of frames, each of which may be displayed for some amount of time and have corresponding timestamps for display. This may correspond to a constantly morphing code may also include a sequence number for each code in the sequence, which allows for correlation of the displayed code to a scanned copy of the code (e.g., similar to a timestamp), as well as rebuilding of the sequence of codes in correct order. The constantly morphing code may include further operations to morph the code, such as by rearranging the dots, boxes, pixels, or other patterns in a QR code, which may give the appearance of fluidity between different codes in the sequence of codes.

At step 444, it is detected that the morphing code was captured at a time, such as by a code scanner during an authorized scan or by an unauthorized device during an unauthorized scan. This may occur through detection of visible or nonvisible light, as well as sound, which may be emitted when the morphing code was scanned. In this regard, when the morphing code is captured by another device, a timestamp may be associated with the capture. This may be done by the merchant POS device and/or code scanner or may be encoded to a portion of the morphing code (e.g., data portions of a QR code). In certain embodiments, this may include detecting when the code is captured such that the specific code is transmitted both by the device and the code scanner of the POS device. In such embodiments, a comparison test of the specifically captured code by the POS device to the one that was displayed by the mobile device may be performed in order to authenticate and validate that the mobile device displayed that code, as discussed below.

Further, at step 446, the morphing code captured by the merchant device/POS and/or code scanner is sent to a payment provider service. Furthermore, the device displaying the morphing code (displaying device) may identify the version of the morphing code that was captured by the merchant device and may independently transmit the identified version of the morphing code to the payment service provider. In one or more embodiments, the displaying device may detect when the morphing code is scanned, and therefore, be able to determine the correct version of the morphing code that was captured. In additional embodiments, the merchant device may transmit a signal to the displaying device that identifies a time when the morphing code was captured so that the displaying device can determine the correct version of the morphing code that was captured.

For example, the displaying device may include a timestamp and/or merchant information with the identified version of the morphing code transmitted to the payment service provider. Therefore, if there is an unauthorized device attempts to reuse the code at a later time (e.g., 3 minute later), the timestamp of the later captured morphing code by a merchant POS device would not match the timestamp of transaction information received from the displaying device or the identified version of the morphing code transmitted by the displaying device. The transaction may be marked as fraudulent. However, where the morphing code is displayed by the device to a valid code scanner (e.g., of a merchant POS device or another interacting mobile device), when both codes are uploaded to a payment provider service, the payment provider service may compare the codes and timestamps to determine that the scan or capture of the code was valid. In further embodiments, the entire sequence and timestamps of codes displayed in the morphing code may be provided to the payment provider service for the comparison and matching purposes. While a timestamp may be used, other processes to correlate the captured code to the displayed code may be used, such as a sequencing of the displayable codes. Further, while the constantly morphing code is being displayed, the code scanner may transmit and/or utilize real-time data of scanning the constantly morphing code in order to perform matching to the code being displayed by the device at a particular time (e.g., by utilising real-time comparison between code scanner input and display device output).

After receiving the morphing code information from the merchant device and the displaying device, the payment service provider may be able to determine, based on comparing the morphing codes received from the displaying device and the merchant device, whether the transaction is fraudulent (the codes do not match) or whether the transaction is valid (the codes match). Thus, at step 448, a result of a comparison of the sent code to the captured code is received. Where the result indicates a valid transaction, a transaction history indicating payment (or rejection if insufficient funds or other restricted activity) may be provided. However, if the code was used in an unauthorized manner and the captured code timestamp or sequence number does not match the sent code, a fraud warning may be sent to the device, which may include processes to protect from fraud.

Figure 5:
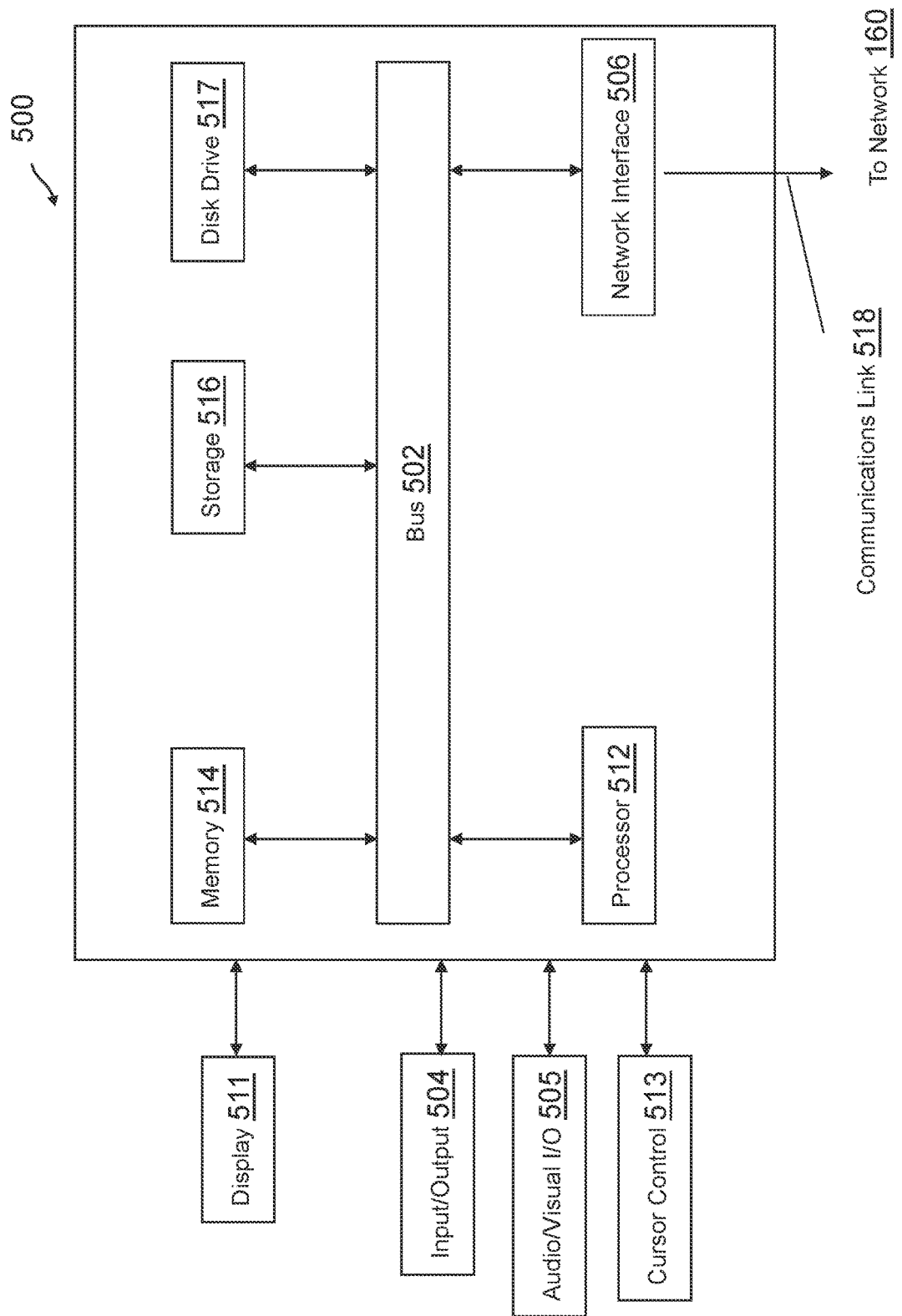
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A first computing device system comprising:
   a non-transitory memory; and
   one or more hardware processors coupled to the non-transitory memory and configured to read instructions from the non-transitory memory to cause the first computing device system to perform operations comprising:
      determining that the first computing device system is in a first mode that enables a display of a first machine-readable code;
      determining that the first mode of the first computing device system requires a security setting to prevent an unauthorized scan of the first machine-readable code, wherein the determining that the first mode requires the security setting comprises:
         detecting a condition requiring the security setting associated with the first machine-readable code, and
         determining the security setting based on the condition;
      determining an operation executable by the first computing device system that prevents the unauthorized scan of the first machine-readable code based on the first mode and the security setting; and
      executing the operation with the first machine-readable code prior to or during the display of the first machine-readable code to a code scanner of a second computing device system.

2. The first computing device system of claim 1, wherein the operations further comprise:
   detecting an attempt to perform an authorized scan of the first machine-readable code by the code scanner of the second computing device system; and
   revealing the first machine-readable code on the first computing device system to be scanned by the code scanner.

3. The first computing device system of claim 2, wherein the detecting the attempt to perform the authorized scan comprises one of detecting at least one of a motion or an orientation of the first computing device system, detecting at least one of a visible light, a nonvisible light, or a sound emitted from the second computing device system, or detecting a pattern of the at least one of the visible light, the nonvisible light, or the sound emitted from the second computing device system.

4. The first computing device system of claim 1, wherein the security setting comprises one of a constantly morphing machine-readable code for the first machine-readable code displayed by the operation or a honeypot machine-readable code displayed in place of the first machine-readable code by the operation, and wherein the honeypot machine-readable code comprises executable code to detect a third computing device system performing the unauthorized scan.

5. The first computing device system of claim 1, wherein the detecting the condition requiring the security setting associated with the first machine-readable code further comprises detecting an attempt to image capture the first computing device system via an optical sensor.

6. The first computing device system of claim 1, wherein the detecting the condition comprises at least one of:
   detecting the unauthorized scan by a third computing device system using one of a signal broadcast by the third computing device system, a visible light and/or a nonvisible light emitted by the third computing device system, or a sound emitted by the third computing device system during the unauthorized scan, or
   determining that the first machine-readable code is visible of an interface of the first computing device system prior to a motion of the first computing device system to present the interface of the first computing device system to the code scanner of the second computing device system.

7. The first computing device system of claim 1, wherein the security setting comprises a visual cryptography animation that masks the first machine-readable code, and wherein the operation masks the first machine-readable code using a masking key associated with the first computing device system.

8. The first computing device system of claim 7, wherein the masking key is retrievable from one of a wireless key fob associated with the first computing device system or a mobile application on the first computing device system.

9. The first computing device system of claim 1, wherein the first mode comprises one of an activation of an application on the first computing device system that is associated with the first machine-readable code, a request to generate or display the first machine-readable code, or an orientation of the first machine-readable code.

10. The first computing device system of claim 9, wherein the first computing device system further utilizes a second mode to perform a scan of a second machine-readable code displayed by one of the second computing device system or another computing device system using a camera of the first computing device system.

11. The first computing device system of claim 1, wherein the security setting comprises a conversion of the first machine-readable code to a dynamic machine-readable code required one or more user inputs to correctly display encoded data from the first machine-readable code, and wherein the determining the operation comprises:
  generating the dynamic machine-readable code from the first machine-readable code; and
  determining one or more visual cues to provide the one or more user inputs with the dynamic machine-readable code.

12. The first computing device system of claim 1, wherein the second computing device system comprises a merchant point-of-sale (POS) device, and wherein the code scanner comprises one of a barcode scanner, quick response (QR) code scanner, a red-light scanner, or an infrared scanner.

13. The first computing device system of claim 1, wherein the operation comprises a gamification of the first machine-readable code that requires a completion of a task prior to use of the first machine-readable code.

14. A method comprising:
  detecting a first condition requiring hiding of a machine-readable code that is being displayed by a first computing device, wherein the machine-readable code comprises encoded data associated with a payment from the first computing device to a second computing device;
  determining a security preference associated with the first computing device for hiding of the machine-readable code when the first condition is detected;
  executing a security operation associated with the security preference based on the detecting the first condition;
  detecting a second condition that indicates that the machine-readable code is to be revealed on the first computing device for a capture by the second computing device;
  revealing the machine-readable code on the first computing device based on the detecting the second condition;
  detecting the capture of the machine-readable code after the revealing the machine-readable code; and
  transmitting one of a timestamp of the capture of the machine-readable code or the machine-readable code to a payment provider service associated with processing the payment from the first computing device to the second computing device.

15. The method of claim 14, wherein the first condition comprises at least one of orientation of the first computing device, an accelerometer reading of the first computing device, a visible light signal detected by the first computing device, an infrared signal detected by the first computing device, a motion detected by the first computing device, an image captured by the first computing device, or a touch input detected by the first computing device.

16. The method of claim 14, wherein the machine-readable code comprises a constantly morphing the machine-readable code comprises a plurality of frames each associated with a different displayable code for the machine-readable code, and wherein the transmitting the one of the timestamp or the machine-readable code to the payment provider service comprises transmitting one or more of the plurality of frames associated with the timestamp.

17. The method of claim 14, wherein the second condition comprises at least one of orientation of the first computing device, an accelerometer reading of the first computing device, a motion detected by the first computing device, a pattern of light emitted by a scanner of the second computing device, a noise emitted by the second computing device, or a decibel level of the noise emitted by the second computing device.

18. The method of claim 14, wherein the detecting the second condition comprises receiving an indication that the second computing device is attempting to perform the capture of the machine-readable code from the first computing device.

19. The method of claim 14, wherein the security preference with the machine-readable code comprises a gamification of the machine-readable code that requires a completion of a task prior to use of the machine-readable code.

20. A non-transitory machine-readable medium having stored thereon machine-readable instructions executable to cause a machine to perform operations comprising:
  determining, by a first device, a machine-readable code to display via an interface of the first device to a second device, wherein the machine-readable code comprises payment data to facilitate a payment from a first account associated with the first device to a second account associated with the second device;
  detecting that the first device is in a display mode to present the machine-readable code on the interface of the first device;
  determining a security setting of the first device that requires the machine-readable code to be obfuscated prior to a display of the machine-readable code by the first device to the second device, wherein the security setting comprises a honeypot machine-readable code having encoded data to cause an identification of at least one additional device capturing the honeypot machine-readable code when displayed by the first device; and
  implementing the security setting with the machine-readable code to obfuscate the machine-readable code prior to the display of the machine-readable code by the first device to the second device, wherein the implementing the security setting comprises displaying the honeypot machine-readable code prior to the display of the machine-readable code based on detecting that the first device is in the display mode.

* * * * *